United States Patent [19]
Bendure

[11] 3,901,336
[45] Aug. 26, 1975

[54] DRIVE UNIT FOR CRAWLER VEHICLE

[75] Inventor: Harry Bendure, Coffeyville, Kans.

[73] Assignee: Gardner-Denver Company, Dallas, Tex.

[22] Filed: Mar. 13, 1974

[21] Appl. No.: 450,637

[52] U.S. Cl............... 180/6.48; 180/9.62; 180/43 B
[51] Int. Cl.² .......................................... B62D 11/00
[58] Field of Search ........... 180/6.48, 6.7, 9.62, 9.2, 180/66 F, 43 B; 305/28

[56] References Cited
UNITED STATES PATENTS

| | | | |
|---|---|---|---|
| 2,940,532 | 6/1960 | Lear | 180/6.7 |
| 3,737,000 | 6/1973 | Knobloch | 180/43 B |
| 3,738,194 | 6/1973 | Lorence | 180/9.62 |
| 3,785,449 | 1/1974 | Ries | 180/6.48 |
| 3,800,901 | 4/1974 | Blomstrom | 180/9.62 |

*Primary Examiner*—Philip Goodman
*Assistant Examiner*—John A. Carroll
*Attorney, Agent, or Firm*—Michael E. Martin

[57] ABSTRACT

A drive unit mountable on a track supporting frame of a crawler vehicle and including a drive sprocket drivably engaged with an endless track assembly. The drive sprocket is rotatably supported on a housing having two spaced apart legs projecting from a base portion of the housing. The drive sprocket includes a toothed rim having internal gear teeth forming the ring gear of an epicyclic speed reduction gear train disposed between two radially extending hubs of the drive sprocket. Further speed reduction gearing and a drive motor are disposed on a detachable cover member disposed on the drive unit housing.

8 Claims, 5 Drawing Figures

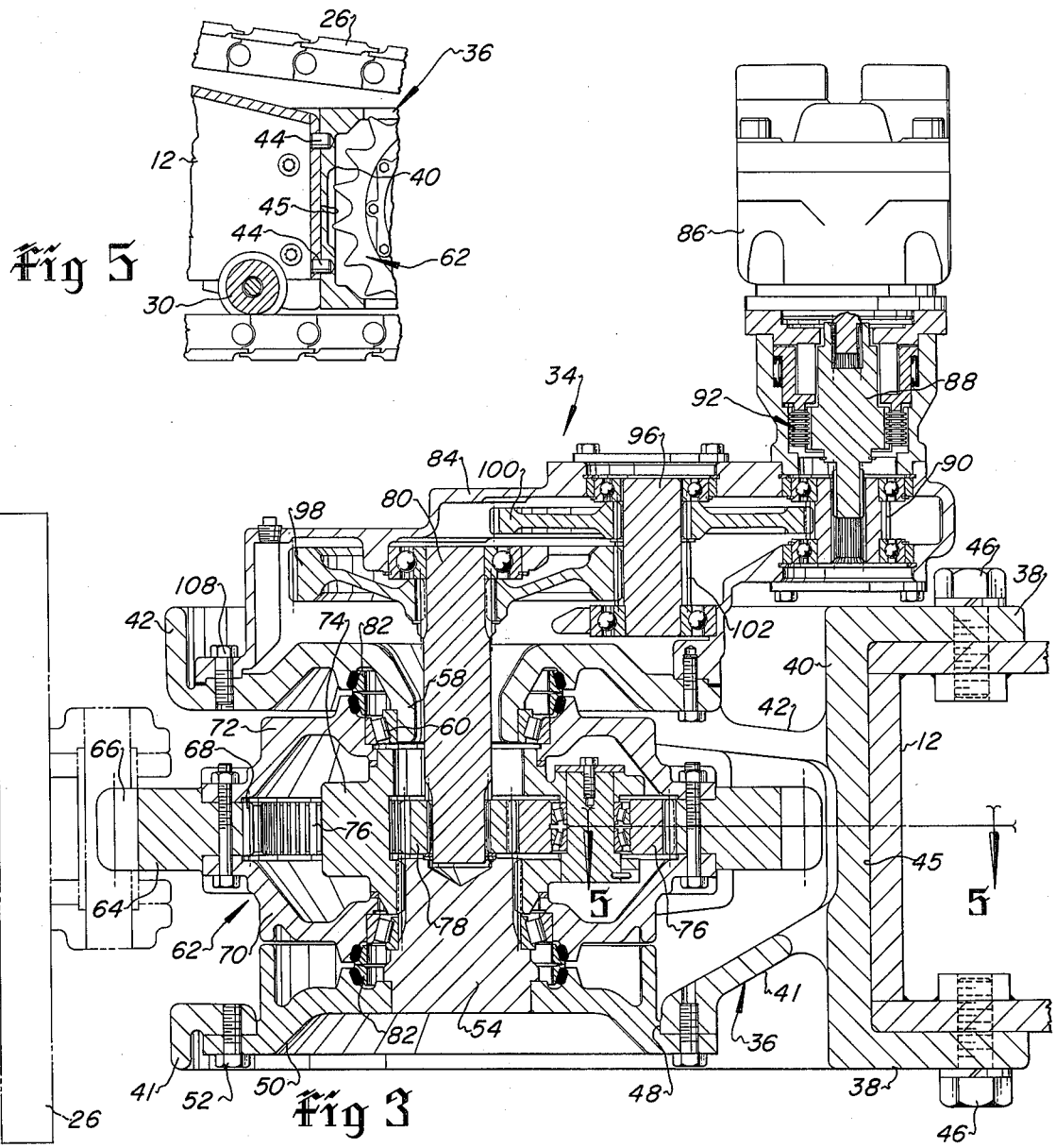
Fig 5
Fig 3
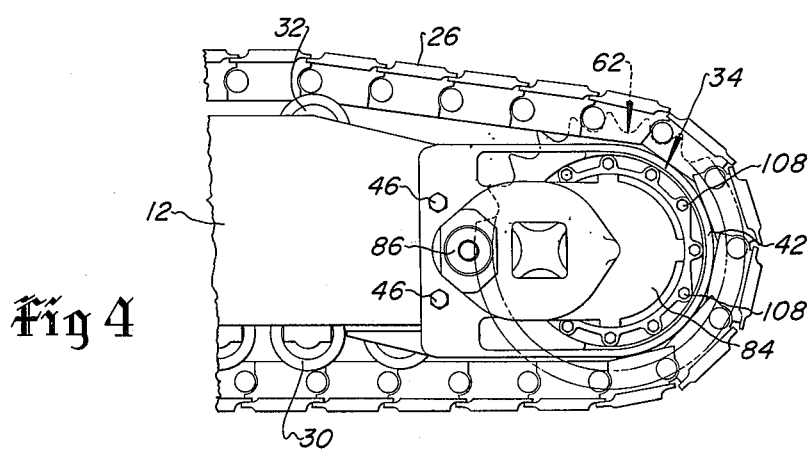
Fig 4

DRIVE UNIT FOR CRAWLER VEHICLE

BACKGROUND OF THE INVENTION

Unitized drive apparatus for crawler vehicles provide numerous advantages including ease of field servicing or replacement of the complete motor and drive mechanism without disassembly and removal of individual parts at the vehicle work site or conversely requiring movement of the vehicle itself to a repair shop.

Because of the severe loads imposed on drive units for crawler vehicles as a result of traversing rough terrain or performing sharp turns and twisting movements with the vehicle itself, it is important that the drive unit be of especially rugged construction. It is also desirable to properly support the main drive sprocket to withstand large forces without early failure of the support bearings and attendant structure. Moreover, conventional drive units for crawler vehicles are generally characterized by gear trains which require considerable space and increase the size of the drive unit. In accordance with the present invention an improved drive unit for crawler vehicles is provided which overcomes the deficiencies of known types of drive units and provides for the desired features mentioned herein as well as others which will be readily recognizable to those skilled in the art. Known types of drive units for crawler vehicles are exemplified by the disclosures of U.S. Pat. Nos. 3,416,623 and 3,773,128.

SUMMARY OF THE INVENTION

In accordance with the present invention there is provided a drive means for crawler vehicles which includes a motor, speed reduction gear train, and final drive sprocket mounted on a housing in such a way as to comprise a rugged and compact unit.

It is an object of the present invention to provide an improved drive unit for crawler vehicles in which at least a portion of a speed reduction gear train is disposed within a drive sprocket of novel construction to provide a more compact and trouble-free drive apparatus.

It is also an object of the present invention to provide a drive unit for crawler vehicles which is characterized by a main housing which supports the drive sprocket on both sides of the sprocket itself. The improved housing of the drive unit of the present invention also provides greater protection for the drive sprocket and support bearings than conventional mounting arrangements for drive sprockets.

The drive unit of the present invention is also characterized by improved mounting means for a drive motor and a portion of a speed reduction drive train, which mounting means comprises a member which may be selectively positioned on the main housing of the drive unit to provide a desired location of the drive motor.

A further object of the present invention is the provision of a drive unit for a crawler vehicle which can be interchangeably used on either track frame of a crawler vehicle thereby eliminating the need for so-called left and right-handed units.

BRIEF DESCRIPTION OF THE DRAWINGS

FIG. 3 is a section view taken from the line 3—3 of FIG. 1;

FIG. 4 is a view taken from the line 4—4 of FIG. 2; and,

FIG. 5 is a fragmentary section view taken from line 5—5 of FIG. 3.

DESCRIPTION OF THE PREFERRED EMBODIMENT

Figure 2:
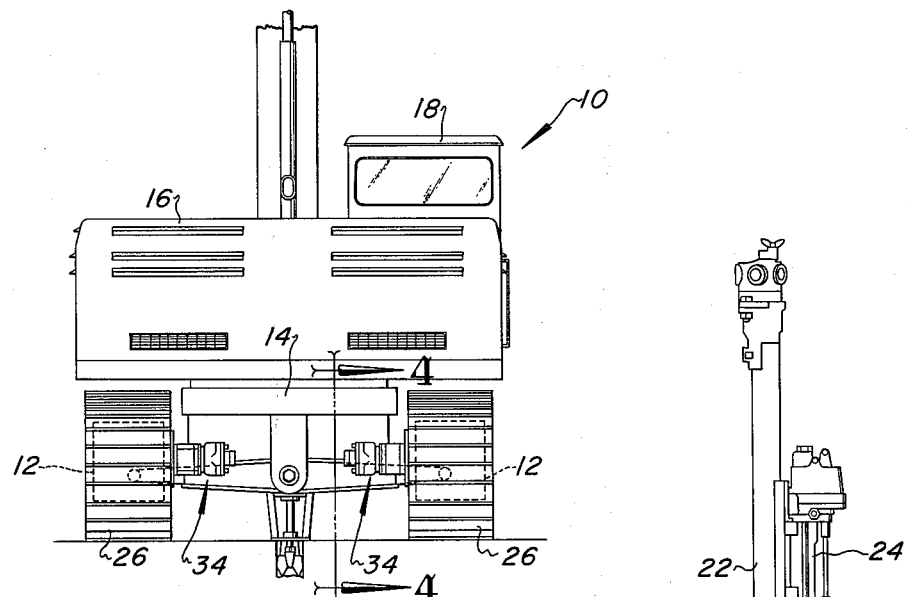
FIG. 2 is a transverse end view of the crawler vehicle of FIG. 1.
Figure 1:
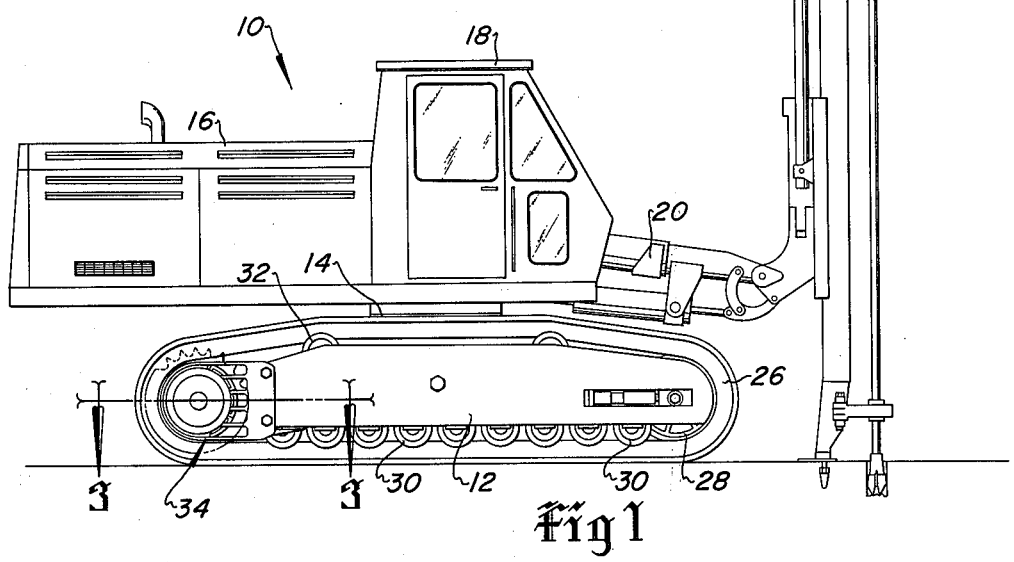
FIG. 1 is a longitudinal side elevation of a crawler vehicle including a pair of track drive units in accordance with the present invention.

Referring to FIGS. 1 and 2 there is illustrated what is generally known as a track type or crawler vehicle, generally designated by the numeral 10. The vehicle 10 includes a pair of spaced apart track support frames 12 (one shown in FIG. 1) which support a frame 14 having disposed thereon a housing 16 and operator's cab 18. The housing 16 includes a suitable engine, not shown, for driving pressure fluid pumps or other suitable power generating means. The exemplary vehicle 10 is self-propelled and includes a movable boom 20 for supporting a rock drill feed unit 22 and drill motor 24. It will be understood that the drive unit of the present invention can be utilized on other crawler vehicles including excavators, cranes, and many types of apparatus characterized by a pair of spaced apart track assemblies supported on suitable frame means.

The crawler vehicle 10 includes a pair of endless flexible track assemblies 26 of conventional construction which are supported on the track frames by an idler wheel 28 disposed adjacent one end of the track frame 12, and guide and support rollers 30 and 32 also disposed on the track frame. A track drive unit, generally designated by numeral 34, is mounted on the track frame 12. The drive unit 34 and idler 28 as well as the rollers 30 and 32 are duplicated on the frame on the side opposite the side of the vehicle shown in FIG. 1.

Referring to FIGS. 3, 4 and 5 the drive unit 34 is characterized by housing means 36 including a pair of spaced apart flanges 38 extending from a transverse base 40. The housing 36 is also bifurcated to form two spaced apart longitudinal integral legs 41 and 42 projecting from the base portion 40. The legs 41 and 42 or portions thereof may also be separate members bolted to the base 40. As shown in FIG. 5, the housing 36 may be at least partially mounted on the track frame 12 by a pair of shear pins 44 which extend from a face 45 into suitable bores in the base portion 40. Bolts 46 form additional means for securing the housing 36 to the track frame 12. The leg 41 of housing 36 includes a relatively large bore 48 in which is removably disposed a bearing support plate 50 fastened to the leg by bolts 52. The plate 50 includes a stationary stub shaft 54 secured thereon and supporting a roller bearing assembly 56. The leg 42 includes an integral hub portion 58 forming a support for a similar roller bearing assembly 60.

The drive unit 34 includes a novel drive sprocket 62 which is mounted in the space formed between the legs 41 and 42 of the housing and is rotatably supported on the bearings 56 and 60. The drive sprocket 62 includes a circular rim 64 having radially outwardly projecting teeth 66 drivingly engageable with the track assembly 26. The rim 64 also includes internal gear teeth forming a ring gear 68 of an epicyclic or star type speed reduction gear train. The rim 64 is removably bolted to spaced apart radially extending hub portions 70 and 72 which are mounted on the respective bearing assemblies 56 and 60. Disposed in the enclosed space formed between the hubs 70 and 72 is a stationary planet or star gear carrier 74 which is splinedly connected to the stub shaft 54 and is formed to support a plurality of rotatable gears 76 in accordance with the teaching of conventional epicyclic gear design. The gears 76 are meshed with the ring gear 68 and with a sun gear 78 mounted on a rotatable shaft 80. Suitable dirt seals 82 prevent the entry of foreign material into the bearings 56 and 60 or the interior of the sprocket 62. Accordingly, drive means comprising at least a portion of a speed reduction gear train is mounted within the interior of sprocket 62 to provide a more compact drive unit. As may be appreciated from the foregoing description, the legs 41 and 42 of the housing 36 form substantial protection for the sprocket 62 and a highly desirable way of supporting same.

The drive unit 34 also is characterized by a housing member 84 removably mounted on the outside of leg 42 and forming with the leg 42 a housing portion for enclosing additional speed reduction gearing. A suitable hydraulic motor 86 is mounted on the member 84 and is drivably connected to the sprocket 62 by means including a shaft 88 which is splined to a rotatable pinion 90 for driving same. A multiple disk fluid actuated brake unit 92 is connected to the shaft 88 for braking the drive unit 34. The housing member 84 supports the shaft 80 on a suitable bearing and the member 84 also rotatably supports an intermediate shaft 96. Gears 98 and 100 are splined to the respective shafts 80 and 96. The gear 98 is meshed with gear teeth 102 integrally formed on shaft 96 and gear 100 is meshed with pinion 90. Accordingly, the motor 86 drives the sprocket 62 through pinion 90, gears 100, 102 and 98, the shaft 80 and the epicyclic star gear arrangement disposed between the sprocket hubs 70 and 72.

As may be appreciated from the foregoing the drive unit 34 provides a compact and rugged apparatus which includes a motor 86 disposed on a housing 36 and drivably connected to the drive sprocket 62 through a speed reduction gear train which is partially disposed in the housing member 84 and partially disposed within the confines of the sprocket 62.

The housing member 84 is provided with a bolt circle and a plurality of evenly spaced bolts 108 whereby the member can be removably positioned on the leg 42 to provide various angular positions of the motor 86 in accordance with ground clearance requirements or the clearance required between the motor and different track frames.

A particular advantage of the drive unit 34 is realized by the construction of the housing 36 which is formed to be substantially symmetrical with respect to a plane passing through the axis of rotation of the drive sprocket 62 and perpendicular to the base 40. The line 3—3 of FIG. 1 would lie in such a plane. Accordingly, merely inverting the unit 34 provide for provides thereof on the opposite track frame or if desired on the same track frame to thereby place the motor and housing member 84 facing laterally outwardly on the sides of the vehicle 10. Such construction eliminates the need for so-called left and right-hand units.

The motors 86 of each drive unit can, of course, be independently controlled by a suitable pressure fluid circuit, not shown, including a pump disposed, as mentioned hereinbefore, in housing 16 and control means disposed in the operator's cab 18.

What is claimed is:

1. A drive unit for driving a flexible track assembly on a crawler vehicle comprising spaced apart track support frames for supporting respective flexible track assemblies thereon, said drive unit comprising:
   a housing mountable on a track support frame of said vehicle and constructed in such a way as to provide for mounting said drive unit on either track support frame of said vehicle, said housing including two spaced apart legs;
   a drive sprocket rotatably supported on said housing between said spaced apart legs and engageable with said track assembly, said drive sprocket comprising two oppositely facing hubs spaced apart one from the other to form an enclosed space between said hubs;
   a speed reduction gear train disposed in said enclosed space formed between said hubs;
   an enclosed portion of said housing formed by one of said legs and a member removably attached to said one leg; and,
   additional speed reduction means disposed in said enclosed portion of said housing and drivably connected to said gear train.

2. The invention set forth in claim 1 wherein:
   said drive unit includes a motor mounted on said member and drivably connected to said additional speed reduction means.

3. The invention set forth in claim 2 wherein:
   said additional speed reduction means comprises a second speed reduction gear train.

4. The invention set forth in claim 2 wherein:
   said member is removably fastened to said one leg by a plurality of threaded fasteners whereby said member, said motor, and said additional speed reduction means can be removed from said housing together.

5. The invention set forth in claim 1 wherein:
   said housing means is of substantially symmetrical form with respect to a plane passing through the axis of rotation of said drive sprocket to thereby provide for mounting said drive unit on either track support frame of said vehicle.

6. A drive unit for driving a flexible track assembly on a crawler vehicle comprising spaced apart track support frames for supporting respective flexible track assemblies thereon, said drive unit comprising:
   a housing mountable on a track support frame of said vehicle, said housing including two spaced apart legs;
   a drive sprocket rotatably supported on said housing between said spaced apart legs and engageable with said track assembly;
   said drive sprocket comprising two oppositely facing hubs spaced apart one from the other to form an enclosed space between said hubs, and a circular rim removably fastened to at least one of said hubs, said rim including radially projecting sprocket teeth for engaging said track assembly;
   an epicyclic speed reduction gear train disposed in said enclosed space formed between said hubs including a portion of said rim having internal gear teeth thereon comprising the ring gear of said gear train;
   an enclosed portion of said housing formed by one of said legs and a member removably attached to said one leg; and, additional speed reduction means disposed in said enclosed portion of said housing and drivably connected to said gear train.

7. A drive unit for driving a flexible track assembly on a crawler vehicle comprising two spaced apart and longitudinally extending track support frames for supporting respective crawler track assemblies thereon, said drive unit comprising:

a housing including a transverse base portion detachably mountable on the rearward end of a track support frame of said vehicle, said housing including two spaced apart legs projecting rearwardly from said base portion;

a drive sprocket engageable with said track assembly and rotatably supported between said spaced apart legs on bearing means disposed on opposite sides of said drive sprocket and supported by said spaced apart legs, said drive sprocket being removable from said housing without removing said housing from said track support frame;

an enclosed portion of said housing formed by one of said legs and a member removably attached to said one leg; and, speed reduction means disposed in said enclosed portion of said housing and drivably connected to said drive sprocket.

8. The invention set forth in claim 7 wherein:

said drive sprocket includes two oppositely facing and spaced apart radially extending hubs forming an enclosed space therebetween, and said drive sprocket includes speed reduction gearing disposed in said enclosed space and drivingly engaged with said drive sprocket and with said speed reduction means.

* * * * *